United States Patent [19]

Nozeran et al.

[11] Patent Number: 4,676,218
[45] Date of Patent: Jun. 30, 1987

[54] ELECTRONIC SYSTEM FOR THE PRODUCTION OF A SIGNAL SYNCHRONOUS WITH AN INTERNAL COMBUSTION ENGINE IGNITION SIGNAL

[75] Inventors: Jean-Marc Nozeran, Toulouse; Jean-Michel Grimaud, Grenade, both of France

[73] Assignee: Bendix Electronics S.A., France

[21] Appl. No.: 801,721

[22] Filed: Nov. 26, 1985

[30] Foreign Application Priority Data

Dec. 4, 1984 [FR] France .................... 84 18453

[51] Int. Cl.[4] ............... F02B 77/08; F02P 15/00; G01P 3/00
[52] U.S. Cl. ............................ 123/618; 324/169
[58] Field of Search ............ 123/333, 335, 351, 352, 123/418, 612, 488, 618; 324/160, 169, 170

[56] References Cited

U.S. PATENT DOCUMENTS

| | | |
|---|---|---|
| 3,202,910 | 8/1965 | Fathaner . |
| 3,563,219 | 2/1971 | Mieras ................... 324/169 X |
| 3,603,878 | 9/1971 | Himmelstein ............ 324/169 |
| 4,194,481 | 3/1980 | Leblanc et al. .......... 324/169 X |
| 4,250,450 | 2/1981 | Yamada et al. .......... 324/169 |
| 4,553,093 | 11/1985 | Chikasue ................ 324/169 |
| 4,587,935 | 5/1986 | Yamazaki ............... 324/169 X |

FOREIGN PATENT DOCUMENTS

| | | |
|---|---|---|
| 2235056 | 8/1973 | Fed. Rep. of Germany . |
| 2462821 | 2/1981 | France . |
| 0919422 | 2/1963 | United Kingdom . |

OTHER PUBLICATIONS

Elektor, "Digital Tachometer", Amsterdam, NL, No. 9, Sep. 1984, pp. 9.45–9.49.

Primary Examiner—Willis R. Wolfe, Jr.
Attorney, Agent, or Firm—Russel C. Wells; Markell Seitzman

[57] ABSTRACT

This system includes hysteresis comparison means (6, 9) whose output goes from a first state to a second state when the voltage of the ignition signal ($S_A$) passes a predetermined high threshold and returns from the second state to the first state when the voltage of the ignition signal drops below a predetermined low threshold, a flip-flop circuit (8) triggered by the means of comparison (6, 9), and whose output delivers the said synchronous signal ($S_S$), and a duration discriminator circuit (7) which only authorizes the switching over the flip-flop circuit (8) in response to the change in the output of the comparison means (6, 9) from the second state to the first state when the said output remains in the first state for a duration at least equal to a predetermined value. This invention may be used for measurement of the speed of an internal combustion engine.

7 Claims, 6 Drawing Figures

ELECTRONIC SYSTEM FOR THE PRODUCTION OF A SIGNAL SYNCHRONOUS WITH AN INTERNAL COMBUSTION ENGINE IGNITION SIGNAL

The present invention relates to an electronic system for the production of a signal synchronous with an internal combustion engine ignition signal.

When the speed of rotation of an engine is required to be known, for example for the purpose of producing a revolution-counter, speed limiter, etc..., it is possible, in the case of gasoline engines, to use the signal coming from the ignition as data. This dispenses with the need to add on a sensor specific to the function.

It is known that, for a given engine, the number of sparks per revolution is constant: for example two ignitions per revolution for a four-cyliner, four-stroke engine. The counting of these pulses during a unit of time determines the speed of rotation of the engine. Similar systems are already known which perform revolution-counter functions by using the ignition signal. These systems include a stage for shaping the ignition signal, a monostable with time constant $\xi$, an integrator and a device to display engine speed. In operation, the ignition signal triggers the monostable whose predetermined time constant $\xi$ depends on the engine type (2 or 4 stroke; 4, 6, ... cylinders). At the output of the monostable a signal is obtained having a period T equal to the period of the ignition signal and of which the mean value of the voltage V is of the form:

$$V = A/T + BN$$

A and B being constants and N being the engine speed (number of rev/min).

The integration of the output signal of the monostable therefore provides a voltage proportional to the engine speed and this is used to control the display device, which will preferably be of analogue type.

Digital systems are also known which provide the same function and which include a shaping stage, a calculator for measuring the period of the shaped ignition signal, the computation of the inverse of that period and the scaling of the result obtained, and a display device.

In these two types of system, the shaping of the ignition signal is fundamental as it is this which guarantees the reproduction of the periodicity of this signal.

These systems for measuring engine speed from the ignition signal are associated with conventional contact breaker ignition systems, whether mechanical or electronic, and take the ignition signal or tachometric signal from the terminals of the contact breaker. Now, the shape of the latter signal is not totally defined and in particular depends upon:

the type of contact breaker used (electrical or mechanical), the ignition manufacturer and the technologies used (transformer winding ratio , etc . . . ), the operating conditions of the engine (speed, load, etc . . . ) and its state of wear (spark plugs, piston rings), the engine type (supercharged or atmospheric, compression ratio).

Because of this, in known embodiments, the shaping circuits are often matched to a specific ignition-engine pair and do not always fulfil their function perfectly.

The invention aims at providing a system for the production of a signal synchronous with the ignition signal of an engine which has a reliable operation and which can be easily adapted to different types of engine and ignition systems.

For this purpose, the subject of the invention is an electronic system for the production of a signal synchronous with an ignition signal taken from the terminals of the contact breaker associated with the ignition coil of an internal combustion engine, further including hysteresis comparison means delivering an output signal, said output signal changing from a first state to a second state when the voltage of the ignition signal passes a predetermined high threshold and returns from the second state to the first state when the voltage of ignition signal drops below a predetermined low threshold, a flip-flop circuit triggered by the comparison means, said flip-flop circuit delivering at its output the said synchronous signal, and a duration discriminator circuit which only authorizes the switching over of the flip-flop circuit in response to the change in the output signal of the comparison means from the second state to the first state when the said output signal remains in the first state for a duration at least equal to a predetermined value.

According to a specific embodiment of the invention, the predetermined high threshold is between the voltage of the initial ignition signal peak and the coil supply voltage, and the predetermined low threshold is between the supply voltage and the voltage corresponding to the recharging of the coil with energy.

According to another specific embodiment of the invention, the duration discriminator circuit includes means to authorize the immediate application to the flip-flop circuit of the output signal of the comparison means during the change from the first state to the second state, and has means to provide, during the change in the output of the means of comparison from the second state to the first state, a time constant between a maximum value enabling the voltage at the input of the flip-flop circuit to reach the switching threshold of said flip-flop circuit and a minimum value preventing the said voltage from reaching the said switching threshold during the oscillation phases of the ignition signal occuring between the initial ignition signal peak and the phase of recharging the coil with energy.

Other characteristics and advantages of the invention will appear from the following description of one of its embodiments given solely by way of example and illustrated by the appended drawings in which.

Figure 1:
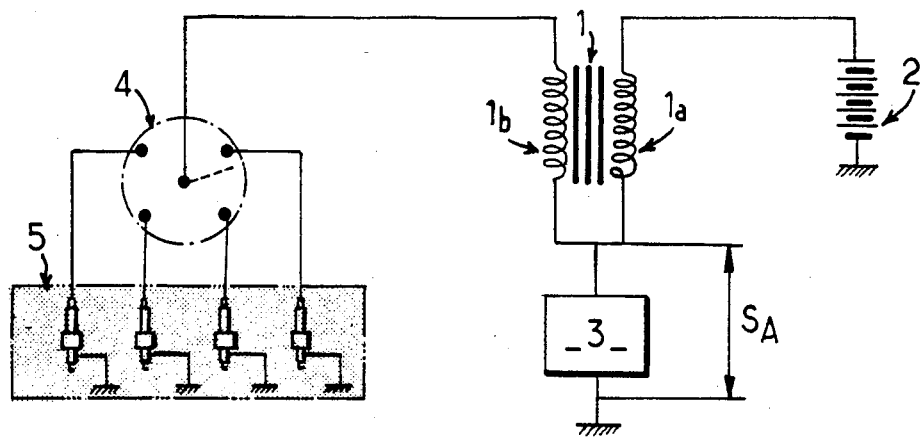
FIG. 1 is a diagrammatic view of a conventional contact breaker ignition system.

Referring to FIG. 1, the ignition system shown includes an ignition coil 1 comprising a primary 1a and a secondary 1b. The primary 1a is connected on the one hand to the supply voltage source 2 and on the other hand to ground through a contact breaker 3. The secondary 1b of the coil is connected between the contact breaker 3 and a distributor 4 which distributes the ignition voltage to the spark plugs 5.

Figure 4A:
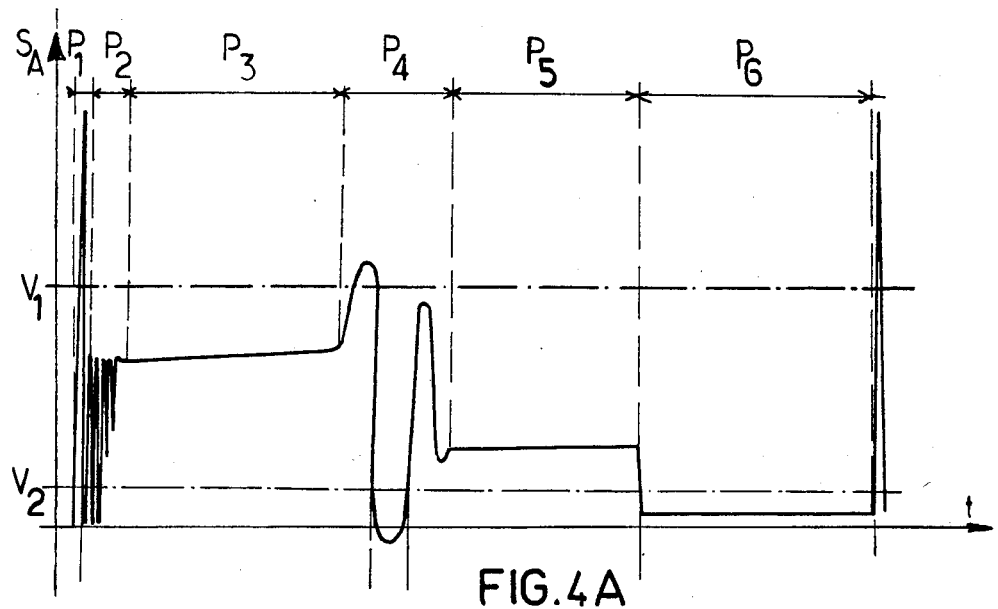
FIG. 4a shows the shape of the ignition signal taken from the terminals of the contact breaker of the ignition system in FIG. 1.

The ignition signal $S_A$ taken from the terminals of the contact breaker 3 has the shape shown in FIG. 4a.

This signal has an initial high voltage peak $P_1$ of amplitude between 50 and 500 volts and of duration variable between 5 and 300 μs. This is followed by high frequency oscillations $P_2$, then a first level $P_3$ corresponding with the presence of the arc at the spark plugs 5. This phase can be completed by high amplitude oscillations $P_4$ (which can exceed 100 volts and drop to below 0 volts) and whose period can reach 600 μs. A second level $P_5$ follows which is lower than the first level $P_3$ and equal to the power supply voltage, followed by a third level $P_6$ that is lower than the second level $P_5$ and corresponding with the recharging of the ignition coil with energy.

The invention exploits the fact that the phases $P_1$ and $P_6$ are practically invariable with respect to the operating conditions and have many similarities in different systems. In addition, these two phases are a good representation of the periodicity of the signal.

Figure 2:
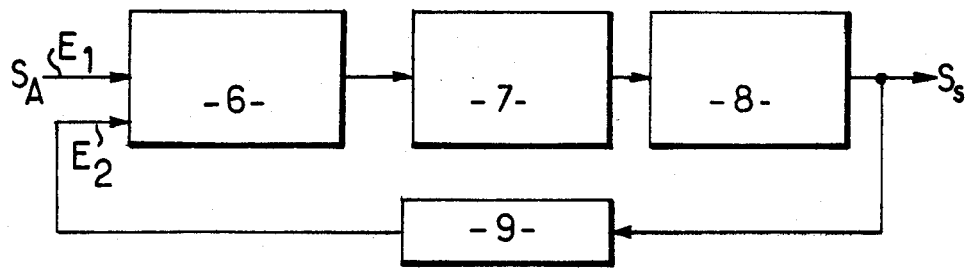
FIG. 2 is a block diagram of a system for the production of a signal synchronous with an ignition signal.

The system according to the invention ensuring the exploitation of the ignition signal is shown in the form of a block diagram in FIG. 2 and includes means of comparison 6 one of whose inputs receives the ignition signal $S_A$ and whose output is applied, via a duration discriminator 7, to a flip-flop circuit 8 whose output delivers the signal $S_S$ synchronous with the ignition signal $S_A$. Finally, the output of the flip-flop circuit 8 is looped back to the other input of the means of comparison 6 via a hysteresis circuit 9.

The system in FIG. 2 is designed so that the output $S_S$ changes state immediately when the input voltage $S_A$ passes a predetermined high threshold, but only returns to its initial state when that same voltage $S_A$ remains below a predetermined low threshold for a time longer than that of the duration discriminator 7.

This system therefore uses phase $P_1$ for the fist switching and phase $P_6$ for the return to the initial state.

Figure 3:
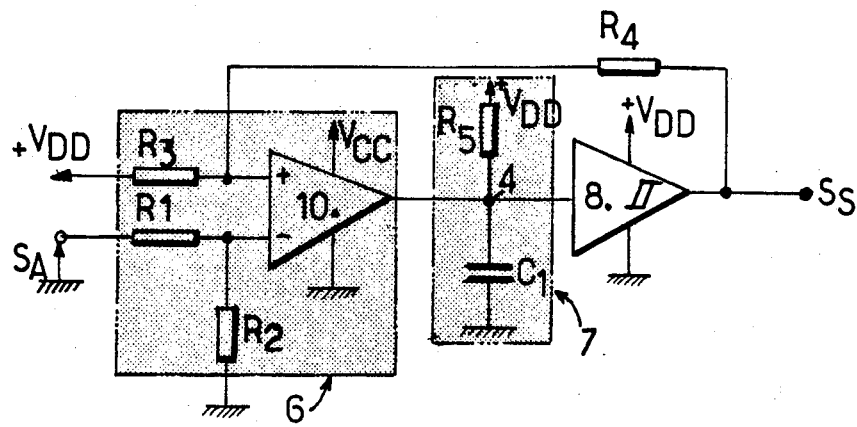
FIG. 3 is an electrical circuit diagram of an embodiment of the system in FIG. 2.

The operation of the system will be better understood in the light of the embodiment in FIG. 3 which will now be described.

The means of comparison 6 include an actual comparator 10 whose positive (+) input receives a reference voltage $V_{DD}$ via a resistor $R_3$. The ignition signal $S_A$ is applied to the negative (−) input of the comparator 10 via a resistor $R_1$ and a resistor $R_2$ is connected between this negative input and ground.

The output of the comparator 10 is applied to the input of the flip-flop circuit 8 via the discriminator circuit 7 comprising, on the one hand, a resistor $R_5$ connected between the output of the comparator 10 and the voltage $V_{DD}$ and, on the other hand, a capacitor $C_1$ connected between the output of the comparator 10 and ground. The signal developed at the common point 4 between the resistor $R_5$, the capacitor $C_1$, the output of the comparator 10 and the input of the flip-flop circuit 8 is called U.

Finally, a resistor $R_4$ representing the hysteresis circuit 9 is connected between the output of the flip-flop circuit 8 and the positive (+) input of the comparator 10. The flip-flop circuit 8 preferably has two triggering thresholds, a high threshold $S_1$ and a low threshold $S_2$.

In operation, in the absence of a signal $S_A$, the negative (−) input of the comparator 10 is connected to ground through the resistor $R_2$. Whatever the state of the output $S_S$ may be, the positive (+) input of the comparator 10 is at a potential V (+) that is higher than the negative (−) input:

if $S_S=0$ Volt, $V(+) = V_{DD} \cdot R_4/(R_4+R_3) > 0$ if $S_S = V_{DD}$, $V(+) = V_{DD} > 0$ The output of the comparator 10 is therefore in the high state. This being advantageously formed by an open collector transistor, this is then in the cut off state. The resistor $R_5$ having charged the capacitor $C_1$, the voltage U is therefore equal to $V_{DD}$. The flip-flop circuit 8 being non-inverting, its output $S_S$ is in the high state and its output voltage is equal to $V_{DD}$. We shall refer to this system state as STATE A.

In this configuration, the positive (+) input of the comparator 10 is at a voltage equal to $+V_{DD}$. If a voltage greater than $V_1$ is applied to inptut $S_A$, $V_1$ being such that $V_1 \cdot R_2/(R_1+R_2) = V_{DD}$, the negative input of the comparator 10 becomes higher than the positive input. The comparator therefore changes state. The output transistor of the comparator 10 conducts and almost immediately discharges the capacitor $C_1$. The voltage U therefore drops to a value close to zero, lower than the low triggering threshold $S_2$ of the flip-flop circuit 8. The output $S_S$ is then in the low state ($S_S=0$) and the positive input of the comparator 10 has a potential defined by the resistors $R_3$ and $R_4$ and equal to $V_{DD} \cdot R_4/(R_3+R_4)$. During this change of state, the system therefore behaves like a simple hysteresis comparator. We shall refer to this system state as STATE B.

When the input $S_A$ is submitted to a voltage lower than $V_2$ with $V_2$ being such that $V_2 \cdot R_2/(R_1+R_2) = V_{DD} \cdot R_4/(R_3+R_4)$, the negative input of the comparator becomes lower than the positive input. The comparator 10 switches over and its output transistor goes from the conducting state to the cut-off state. The capacitor $C_1$ is charged through the resistor $R_5$ and the voltage U tends exponentially towards $V_{DD}$.

As long as the voltage U remains below the switch-over threshold of circuit 8, the output $S_S$ is held in the low state and the value of the voltage of the (+) input of the comparator 10 does not change. If, before the voltage has reached the high switching threshold $S_1$ of the flip-flop circuit 8, the voltage in the $S_A$ input exceeds the previously defined threshold $V_2$, the comparator 10 returns to the low level and the capacitor $C_1$ is discharged. The system therefore remains in state B with no switching of the output $S_S$ having taken place. In order for the output $S_S$ to switch and the system to return to state A, it is necessary for the output transistor of the comparator 10 to remain continuously cut off (and therefore for the $S_A$ input to remain lower than $V_2$) for a for a time long enough for the voltage U to have reached the high switching threshold $S_1$ of the flip-flop circuit 8.

Figure 4B:
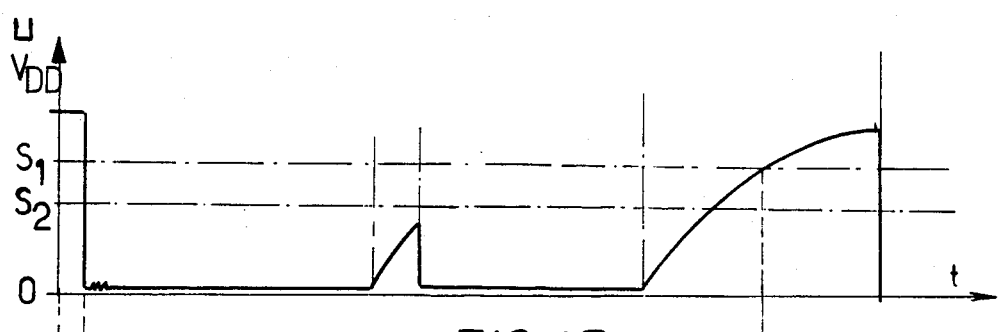
FIG. 4b shows the shape of the signal obtained at the output of the hysteris comparator of the system in FIGS. 2 and 3.
Figure 4C:
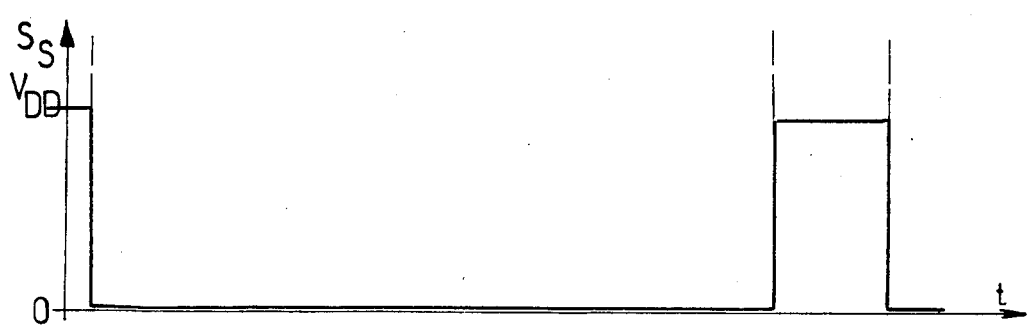
FIG. 4c shows the shape of the signal synchronous with the ignition signal obtained at the output of the system in FIGS. 2 and 3.

If we now consider the signal waveforms given in FIGS. 4A, 4B and 4C, the threshold $V_1$ is chosen so that the output $S_S$ switches during phase $P_1$.

In phase $P_2$, we observe variations in the voltage U due to the fact that the ignition signal $S_A$ drops below the $V_2$ threshold. However, the time constant $R_5 \cdot C_1$ of the discriminator 7 is chosen so that the amplitude of these variations does not reach the switching threshold of the flip-flop circuit 8. During phase $P_3$, the signals U and $S_S$ are held in the low state by choosing a $V_2$ threshold lower than the voltage of the ignition signal $S_A$ during this phase.

During phase $P_4$, the ignition signal $S_A$ can have values lower than $V_2$. It is therefore necessary to choose a time constant $R_5C_1$ of the discriminator circuit 7 so that the U amplitude of the signal does not affect the flip-flop circuit 8. The consecutive duration of the ignition signal $S_A$ at a level lower than $V_2$ conditions this time constant $R_5C_1$ of the discriminator 7.

During phase $P_5$, the U and $S_S$ voltages must remain at the low level. $V_2$ must therefore be chosen lower than the voltage of the ignition signal $S_A$ during this phase, i.e. lower than the power supply voltage of the ignition system.

In phase $P_6$, the output signal $S_S$ must be able to switch over. In order to do this, the voltage $V_2$ must be higher than the voltage generated during this phase, which corresponds to the recharging of the coil with energy, and the time constant of the discriminator 8 must be such that the high threshold $S_1$ of the flip-flop circuit 8 can be reached during this phase.

It can be seen therefore that by suitably choosing the thresholds $V_1$ and $V_2$ and the time constant of the discriminator 7, the ignition signal is filtered and shaped. At the output of such a system, we have easily available data relating to the periodicity of the ignition signal and the moment at which the spark is produced at the spark plug, which corresponds to the falling edge of the signal $S_S$.

Numerous modifications can be made to the embodiment described without departing from the scope of the invention. In this way, for example, the flip-flop circuit may have only one switching threshold, the existence of two thresholds $S_1$ and $S_2$ being associated with the characteristics of the available circuits.

We claim:

1. In an internal combustion engine, an electronic system for generating a signal synchronous with an ignition signal taken from one of the terminals of an ignition coil having one of its other terminals coupled to a voltage supply, said system including:

comparison means responsive to the ignition signal and a high and low threshold voltage for generating an output signal changing from a first state to a second state when the voltage of the ignition signal is greater than said high threshold voltage ($V_1$) and changing from said second state to said first state when the voltage of the ignition signal is less than said low threshold voltage ($V_2$);

a duration discriminator means responsive to said output signal remaining in the first state for a predetermined time prior to changing to said second state for generating a triggering signal as long as said output signal is in said second state;

a flip-flop means triggered by said triggering signal for delivering at its output the synchronous signal.

2. An electronic system according to claim 1, wherein the value of said predetermined high threshold voltage ($V_1$) is between the voltage of an initial peak of the ignition signal and the voltage supply and the value of said predetermined low threshold voltage ($V_2$) is between the voltage supply and the voltage corresponding with the recharging of the coil.

3. An electronic system according to claim 1, wherein said duration discriminator means further includes means for switching said flip-flop means when said output signal of said comparison means changes from the first state to the second state, and means to provide during the change in said output signal of said comparison means from the second state to the first state, a time constant between a maximum value enabling the voltage at the input of said flip-flop means to reach a threshold triggering voltage for switching of said flip-flop means and a minimum value preventing said voltage from reaching said threshold triggering voltage during the oscillation phases of the ignition signal occurring between said initial peak of said ignition signal and a recharging phase of the ignition coil.

4. An electronic system according to claim 1 wherein said comparison means further includes a comparator and a feedback loop between the output of said flip-flop means and one input of the comparator.

5. An electronic system according to claim 4, wherein the output of said comparator comprises an open collector transistor which is cut off in the first state of said output signal and conducting in the second state of said output signal and said duration discriminator means comprises a resistor ($R_5$) connected between a reference voltage source ($V_{DD}$) and the common point at the output of comparator and the input of said flip-flop means and a capacitor connected between said common point and ground.

6. An electronic system according to claim 4, wherein said feedback loop comprises a resistor ($R_4$) connected between the output of said flip-flop means and the positive output of the comparator, said positive input being connected to a reference voltage ($V_{dd}$) through a resistor ($R_3$), the negative input of the comparator being connected to ground through a resistor ($R_2$) and receiving the ignition signal through another resistor ($R_1$).

7. An electronic system according to claim 6, wherein said high threshold voltage ($V_1$) is equal to:

$$V_{DD}*(R_1+R_2)/(R_2)$$

and said low threshold voltage ($V_2$) is equal to:

$$(V_{DD})*(R_4)/(R_3+R_4)*(R_1+R_2)/(R_2).$$

* * * * *